(12) United States Patent
Summers et al.

(10) Patent No.: US 10,287,218 B2
(45) Date of Patent: May 14, 2019

(54) SOLID PROPELLANT ADDITIVE MANUFACTURING METHOD AND SYSTEM

(71) Applicant: Raytheon Company, Waltham, MA (US)

(72) Inventors: Matthew H. Summers, Marana, AZ (US); Jeremy C. Danforth, Tucson, AZ (US); David G. Garrett, Tucson, AZ (US); Mark T. Langhenry, Tucson, AZ (US)

(73) Assignee: Raytheon Company, Waltham, WA (US)

( * ) Notice: Subject to any disclaimer, the term of this patent is extended or adjusted under 35 U.S.C. 154(b) by 301 days.

(21) Appl. No.: 15/232,339

(22) Filed: Aug. 9, 2016

(65) Prior Publication Data

US 2018/0044257 A1 Feb. 15, 2018

(51) Int. Cl.
| | |
|---|---|
| *C06B 21/00* | (2006.01) |
| *B33Y 10/00* | (2015.01) |
| *B33Y 30/00* | (2015.01) |
| *B33Y 40/00* | (2015.01) |
| *B33Y 70/00* | (2015.01) |

(Continued)

(52) U.S. Cl.
CPC .......... *C06B 21/0058* (2013.01); *B29B 7/007* (2013.01); *B29C 67/0081* (2013.01); *B33Y 10/00* (2014.12); *B33Y 30/00* (2014.12); *B33Y 40/00* (2014.12); *B33Y 70/00* (2014.12); *B33Y 80/00* (2014.12); *C06B 21/0008* (2013.01); *C06B 21/0025* (2013.01); *C06B 21/0033* (2013.01); *B29K 2023/00* (2013.01); *B29K 2505/00* (2013.01); *B29L 2031/20* (2013.01); *B29L 2031/3097* (2013.01)

(58) Field of Classification Search
None
See application file for complete search history.

(56) References Cited

U.S. PATENT DOCUMENTS

| | | | |
|---|---|---|---|
| 4,128,441 A | 12/1978 | Cucksee et al. | |
| 4,597,811 A | 7/1986 | Ducote | |

(Continued)

OTHER PUBLICATIONS

International Search Report and Written Opinion for corresponding International Application No. PCT/US2017/021816 dated Jun. 9, 2017.

*Primary Examiner* — Michael P. Rodriguez
(74) *Attorney, Agent, or Firm* — Renner, Otto, Boisselle & Sklar, LLP

(57) ABSTRACT

A method of additively manufacturing propellant elements, such as for rocket motors, includes partially curing a propellant mixture before extruding or otherwise dispensing the material, such that the extruded propellant material is deposited on the element in a partially-cured state. The curing process for the partially-cured extruded material may be completed shortly after the material is put into place, for example by the material being heated at or above its cure temperature, such that it finishes curing before it fully cools. The propellant material may be prepared by first mixing together, a fuel, an oxidizer, and a binder, such as in an acoustic mixer. After that mixing a curative may be added to the mixture. The propellant mixture may then be directed to an extruder (or other dispenser), in which the mixture is heated to or above a cure temperature prior to the deposition, and then deposited.

12 Claims, 2 Drawing Sheets

(51) Int. Cl.
*B33Y 80/00* (2015.01)
*B29B 7/00* (2006.01)
*B29C 67/00* (2017.01)
*B29K 23/00* (2006.01)
*B29K 505/00* (2006.01)
*B29L 31/20* (2006.01)
*B29L 31/30* (2006.01)

(56) References Cited

U.S. PATENT DOCUMENTS

| | | | | |
|---|---|---|---|---|
| 4,776,993 | A | * | 10/1988 | Chang ................. C06B 21/0025 149/109.6 |
| 4,792,423 | A | * | 12/1988 | Craig ........................ F02K 9/24 102/289 |
| 6,183,574 | B1 | * | 2/2001 | Warren ............... C06B 21/0025 149/109.6 |
| 2010/0294113 | A1 | * | 11/2010 | McPherson ......... C06B 21/0008 86/1.1 |

* cited by examiner

SOLID PROPELLANT ADDITIVE MANUFACTURING METHOD AND SYSTEM

FIELD OF THE INVENTION

The invention is in the field of methods and systems for manufacturing solid propellants.

DESCRIPTION OF THE RELATED ART

Prior processes for making solid propellant pieces, such as for rocket motors or other uses, have been batch processes. In such prior processes the mixing of the propellant material mixture may occur at a first location, the casting or other depositing of it to build up a propellant piece may occur at a second location, and the curing of the propellant piece may occur at a third location. This process may involve considerable delays for the transportation between steps, and certain individual steps may take significant amounts of time, for example with the curing process taking days or weeks. In addition safety precautions may need to be taken in transportation, for example when transporting the raw propellant mixture from a mixing location to an additive manufacturing location, and/or when transporting an uncured propellant piece to a cure oven or other curing apparatus.

SUMMARY OF THE INVENTION

A method of additively manufacturing a propellant element includes dispensing partially-cured propellant mixture material to build up the propellant element.

A method of additively manufacturing a propellant element includes mixing in a curative in a separate step, after fuel, oxidizer, and a binder are mixed together.

A method of additively manufacturing a propellant element includes heating a curable propellant mixture, to above its cure temperature, prior to dispensing the curable propellant mixture.

According to an aspect of the invention, a method of additively manufacturing a propellant element includes the steps of: mixing together fuel, oxidizer, and a binder, to form a propellant mixture; after the mixing, adding a curative to the propellant material to produce a curable propellant mixture; after the adding the curative, partially curing the curable propellant mixture; and after the partially curing, dispensing the curable propellant mixture as part of the propellant element.

According to an embodiment of any paragraph(s) of this summary, the mixing, the adding, and the dispensing are all parts of a continuous process, with material proceeding from one step directly to subsequent steps.

According to an embodiment of any paragraph(s) of this summary, the mixing includes mixing the fuel, the oxidizer, and the binder in an acoustic mixer, to produce the propellant mixture.

According to an embodiment of any paragraph(s) of this summary, the adding the curative occurs in a second mixer, downstream from the acoustic mixer.

According to an embodiment of any paragraph(s) of this summary, a method further includes heating the propellant mixture after the adding the curative to produce a curable propellant mixture, and before the dispensing.

According to an embodiment of any paragraph(s) of this summary, in the partially curing includes heating the curable propellant mixture above a cure temperature of the curable propellant mixture.

According to an embodiment of any paragraph(s) of this summary, the heating includes heating the curable propellant mixture prior to the dispensing, such that the curing of the curable propellant mixture is completed while the curable propellant mixture cools after the dispensing. The curing process may begin just before a dollop or quantum of propellant material is dispensed, as the propellant material is dispensed, or after the propellant material is dispensed. The curing process may continue as all surrounding portions of material are placed in contact with the dispensed propellant material dollop, eventually leading to full cure of the propellant material.

According to an embodiment of any paragraph(s) of this summary, the heating includes heating the propellant mixture to a constant temperature that is greater than or equal to that of the cure temperature of the curable propellant material.

According to an embodiment of any paragraph(s) of this summary, the heating includes heating the propellant mixture to time-varying temperatures that are greater than or equal to that of the cure temperature, According to an embodiment of any paragraph(s) of this summary, the partially curing includes curing the curable propellant mixture at least 50% before the dispensing.

According to an embodiment of any paragraph(s) of this summary, the partially curing includes curing the curable propellant mixture at least 90% before the dispensing.

According to an embodiment of any paragraph(s) of this summary, the partially curing includes curing the curable propellant mixture at least 95% before the dispensing.

According to an embodiment of any paragraph(s) of this summary, the dispensing includes extruding the curable propellant mixture.

According to an embodiment of any paragraph(s) of this summary, the method includes, after the dispensing, finishing curing of the curable propellant mixture, during build-up of the propellant piece.

According to another aspect of the invention, a system for additively manufacturing a propellant piece, comprises: a first mixer; a second mixer; a dispenser; and a heater; wherein the material continuously moves from 1) the first mixer, in which fuel, oxidizer, and a binder are mixed to form a propellant mixture, to 2) the second mixer, in which a curative is added to the propellant material to produce a curable propellant mixture, to 3) the dispenser, with the heater used to heat and partially cure the curable propellant mixture before the curable propellant mixture is dispensed by the dispenser.

According to another aspect of the invention, a system for additively manufacturing a propellant piece, comprises: a mixer; a dispenser; and a heater; wherein the material continuously moves from 1) the mixer, in which fuel, oxidizer, binder, and curative are mixed to form a propellant mixture, to 2) the dispenser, with the heater used to heat and partially cure the curable propellant mixture before the curable propellant mixture is dispensed by the dispenser.

According to an embodiment of any paragraph(s) of this summary, the first mixer is an acoustic mixer.

According to an embodiment of any paragraph(s) of this summary, the second mixer (when used) may be an acoustic mixer According to an embodiment of any paragraph(s) of this summary, the dispenser is an extruder.

According to an embodiment of any paragraph(s) of this summary, the heater is an electrical heater.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

The annexed drawings, which are not necessarily to scale, show various aspects of the invention.

DETAILED DESCRIPTION

A method of additively manufacturing propellant elements, such as for rocket motors, includes partially curing a propellant mixture before extruding or otherwise dispensing the material, such that the extruded propellant material is deposited on the element in a partially-cured state, such as by being mostly cured. The curing process for the partially-cured extruded material may be completed shortly after the material is put into place, for example by the material being heated at or above its cure temperature, such that it finishes curing before it fully cools. The propellant material may be prepared by first mixing together, a fuel, an oxidizer, and a binder, such as in an acoustic mixer. After that mixing a curative may be added to the mixture. The propellant mixture may then be directed to an extruder (or other dispenser), in which the mixture is heated to or above a cure temperature prior to the deposition, and then deposited. The dwell time at which the material is cured (heated at or above a cure temperature after mixing in of the curative) before being extruded may be selected such that the propellant mixture is dispensed when in nearly-fully-cured form, with the cure completed after the material is extruded, and before the material cools. The process may be performed as a continuous flow process, with the material proceeding from the first mixing process, to the mixing in of the curative, to the heating and extrusion (or other deposition) of the material. The process described above may be faster than previous processes, for instance doing away with long cure times in a separate oven. In addition the process may be safer, minimizing the need to handle mixed propellant material.

Figure 1:
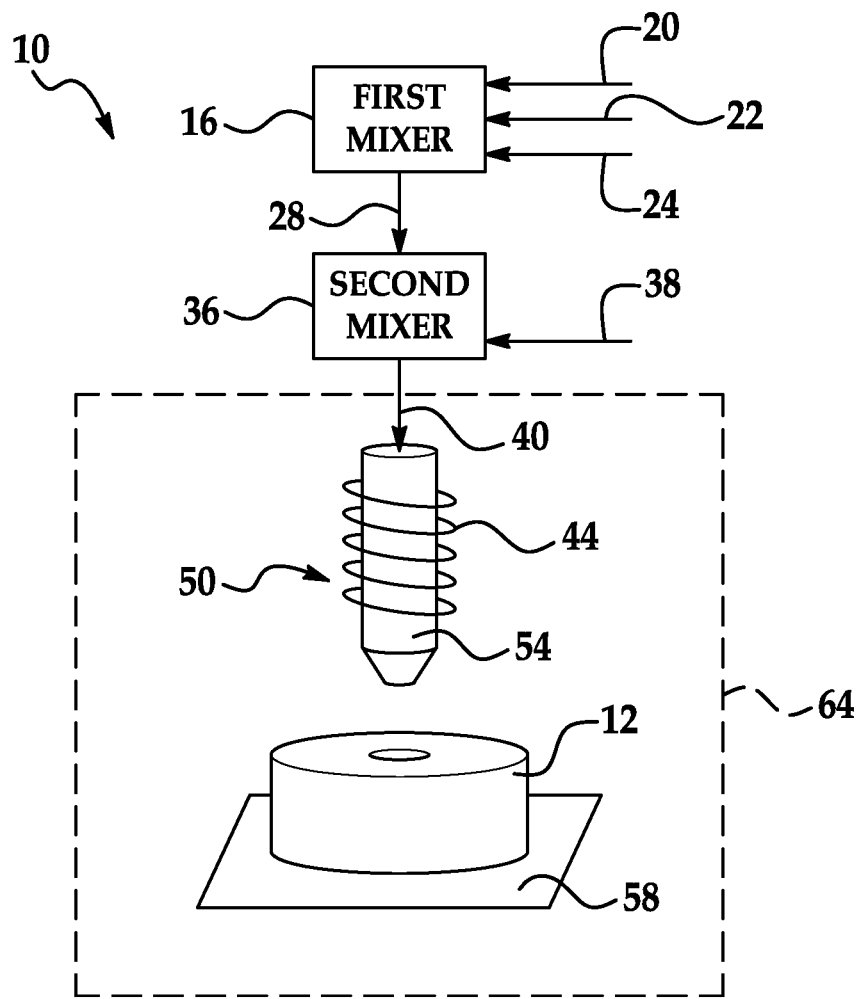
FIG. 1 is a schematic diagram of an additive manufacturing system in accordance with an embodiment of the present invention.
Figure 2:
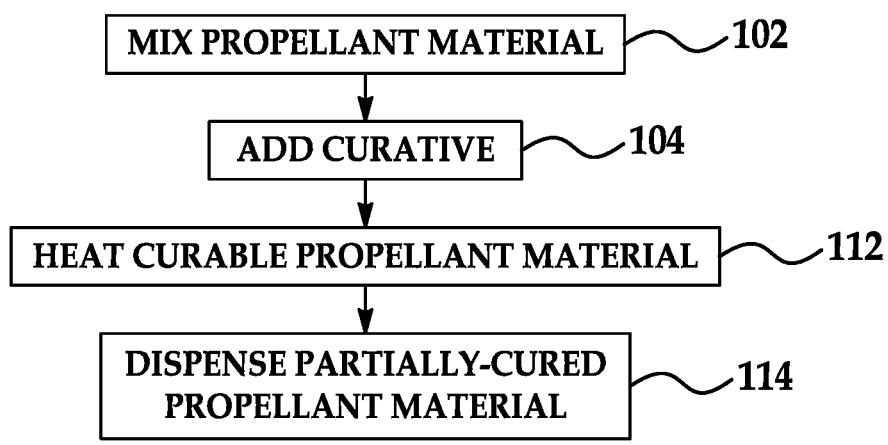
FIG. 2 is a high-level flow diagram of a method of additive manufacturing in accordance with an embodiment of the present invention.

FIG. 1 shows a system 10 for additively manufacturing a propellant element or piece 12. The system 10 is used for additively manufacturing the propellant element 12, in a process 100 outlined in FIG. 2.

In a step 102 in the process 100, a propellant mixture is made from constituent components in a first mixer 16. The first mixer 16 receives inputs of fuel 20, oxidizer 22, and binder material 24. The inputs 20-24 may be in separate feed lines that feed appropriate amounts of the constituent components into the mixer 16. The first mixer 16 may be an acoustic mixer that blends the inputs 20-24 together to produce a propellant mixture 28 that exits the first mixer 16.

The fuel 20 may be a metal-based fuel, for example including tungsten, magnesium, copper oxide, copper, titanium, titanium oxide, aluminum, and/or aluminum oxide. The oxidizer 22 may be a perchlorate-based oxidizer that includes ammonium perchlorate, aluminum perchlorate, barium perchlorate, calcium perchlorate, lithium perchlorate, magnesium perchlorate, perchlorate acid, strontium perchlorate, and/or sodium perchlorate, to give a few examples. The oxidizer 22 may be a nitrate-based oxidizer that includes ammonium nitrate, nitric acid, sodium nitrate, to give a few examples. The binder 24 may be comprised of primary resin materials that include hydroxyl-terminated polybudadiene (HTPB) and (CTPB), to give a few examples. The binder 24 may also comprise of bonding agents, cure catalysts, and additional liquid burn rate modifiers. These materials are only examples, and other suitable materials for the constituent components 20-24 may be used as alternatives to or in addition to the materials listed above.

The constituent components 20-24 may be introduced into the mixer 16 in any of a variety of formats, such as being solids, liquids, in solution, or in slurries, to give a few examples. The relative amounts fed into the mixer 16 may be controlled by any of a variety of mechanisms, such as by use of suitably-sized orifices or by use valves that can control the feed rate of the components 20-24.

In step 104, a second mixer 36 is used to add a curative material 38 to the propellant mixture 28, to produce a curable propellant mixture 40. The addition of the curative 38 at least enhances the curability of the previously-formed propellant mixture 28, although the propellant mixture 28 may be curable to some degree even without the addition of the curative 38.

The second mixer 36 may be similar to the first mixer 16, or may be a different type of mixer. For example the second mixer 36 may be a rotational mixer. The curative 38 may be introduced into the second mixer 36 in any of a variety of forms, such as a solid, a liquid, or a slurry.

The curative 38 may be any of a variety of suitable materials to aid curing of the curable propellant mixture 40. Examples of suitable curatives include isocyanates, di-isocyanates, modified isocyanates, modified di-isocyanates.

The amount of the curative 38 added into the mixer 36 (the rate at which the curative 38 is introduced into the mixer 36) may be controlled using valves, orifices, motors, and/or or any of a variety of other suitable devices and/or means. The amount (or rate) of introduction in the curative 38 may be selected in conjunction with other characteristics of the system 10, such as heating characteristics, temperatures, flow rates, and/or dwell times of curing prior to deposition, such that the curable propellant mixture 40 is deposited (such as by being extruded) in a desired cure state.

Other additives may be added at the first mixer 16 and/or the second mixer 36. Such other additives, if used, may include one or more of the following non-limiting examples: burn rate modifiers, cure catalysts, and anti-oxidant agents.

After the mixing in of the curative 38 the curable propellant mixture 40 is heated by a heater 44 in step 112, and is dispensed in step 114 onto the propellant piece 12 from a dispenser 50. The dispenser 50 may be an extruder, as is shown in the illustrated embodiment.

Figure 3:
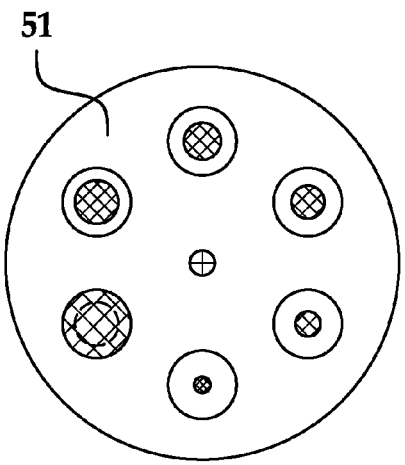
FIG. 3 is a plan view array of nozzles for use with an embodiment of the dispenser of the system of FIG. 1.
Figure 4:
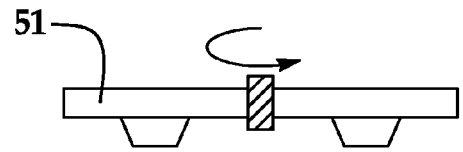
FIG. 4 is a side view of the array of nozzles of FIG. 3.

With reference to FIGS. 3 and 4, the dispenser 50 may include an array 51 of nozzles, for example in the form of a wheel which may be rotated about a central axis to allow different of the nozzles to be put into operation to dispense propellant material. The different nozzles may have different sizes and/or shapes of openings for dispensing material, to allow control of the flow of dispensed material.

Figure 5:
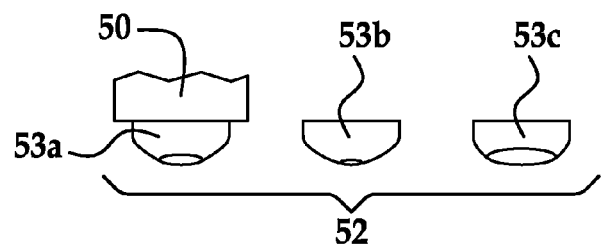
FIG. 5 is a schematic side view of a set of nozzles for use with an embodiment of the dispenser of the system of FIG. 1.

As an alternative, the dispenser 50 may be an extruder that is able to receive different sizes of nozzles, for example with different nozzles able to be swapped in and out to change the rate at which material is dispensed (to increase or decrease the flow rate of material). For example, with reference to FIG. 5, a set of nozzles 52 may have multiple nozzles 53a, 53b, and 53c, with different sizes and/or shapes of openings for dispensing propellant material. The desired one of the nozzles 53a-53c may be secured to the rest of the dispenser 50 by any of a variety of possible attachment methods, such as use of magnets, a friction fit, a mechanical locking feature, or a threaded connection, to give a few non-limiting examples.

The heater 44 and the dispenser/extruder 50 may be integrated in a single device, with for example the heater 44 being used while the propellant mixture 40 is in the dispenser 50, waiting to be dispensed onto the propellant piece 12. For example the heater 44 may be an electric resistive heater, wrapped around part of the dispenser 50, for example a reservoir 54 (FIG. 2) that the curable propellant mixture 40 is maintained in (and flows along) as the curable propellant mixture 40 flows from the second mixer 36 to where it is dispensed onto the propellant piece 12.

Many types of heating may be used in the heater 44. As an alternative to the resistive heating mentioned above, the heater 44 may use piped hot liquid to heat the curable mixture 40, for example. A feedback system may be used to control the heating from the heater 44. For example input temperature sensors of both direct (i.e. thermometers, thermistors, infrared detectors and sensors, etc.) and indirect measurement techniques (viscosity changes as a function of temperature, other fluid properties as a function of temperature, heat transfer from a heat source as a function of temperature, other mechanical properties as a function of temperature, etc.) may be used to control the heating input, such as by controlling the amount of power provided to a resistive heater or the flow of hot liquid used for the heating.

The heating from the heater 44 may be used to partially cure the curable propellant mixture 40 prior to the mixture 40 being dispensed onto propellant piece 12. The heater 44 may be configured to heat the mixture to at least a cure temperature as is proceeds through the reservoir 54. The mixture 40 may be heated at or above the cure temperature for a dwell time td, prior to the partially-cured material being extruded onto the propellant piece 12. The heating may be such that the mixture 40 is at a substantially-constant temperature through the dwell time. Alternatively the mixture 40 may be at a non-constant temperature during the dwell time. For example the mixture 40 may receive additional heating just prior to being dispensed, so that it is sufficiently above its cure temperature so that the curing finishes after it is dispensed onto the propellant piece 12, during the cooling process. The curing may continue even after all surrounding dollops or quanta of propellant material (e.g., extruded portions of propellant material in contact with a given portion of propellant material) have been dispensed into place. Any of a variety of temperature profiles for the material 40 during the dwell time may be used, with the curable mixture 40 at or above its cure temperature, while maintaining it below an auto-ignition temperature at which the mixture 40 spontaneously ignites, as well as preventing any substantial decomposition of the mixture 40.

The heating and the dwell time may be selected such that the mixture 40 is mostly cured by the time it is deposited onto the propellant piece 12. The cure during the dwell time before extrusion of a given bit of the mixture 40 may be at least 50% cured, at least 55% cured, at least 60% cured, at least 65% cured, at least 70% cured, at least 75% cured, at least 80% cured, at least 85% cured, at least 90% cured, at least 95% cured, or at least 97% cured. It will be appreciated that it is highly undesirable for the mixture 40 to reach a fully cured state during the dwell time, before exiting the dispenser/extruder 50. Reaching full cure of the material 40 before it is dispensed would probably result in plugging up of the dispenser 50. In addition, depositing fully cured material may be undesirable in that such material may not be able to adhere to other parts of the propellant piece 12.

The dispenser 50 may be configured to produce a suitable dwell time within the dispenser 50, to allow desired partial curing of the mixture 40 before the mixture 40 is dispensed. For example the length and diameter of the reservoir 54 may be configured to achieve a desired dwell time. The back-pressure and area of the pressure application at the front-end of the process (when used) may be configured to achieve a desired dwell time. The vacuum pressure and area of the vacuum application at the aft-end of the process (when used) may be configured to achieve a desired dwell time. The length and diameter of the mix lines may be configured to achieve a desired dwell time. The length and diameter of the cast and cure lines may be configured to achieve a desired dwell time. The material properties of the material may be configured to achieve a desired dwell time (i.e. viscosity and dimensions of the lines impact flow rates).

The propellant piece 12 is on a platform or bed 58 that is able to move relative to the dispenser 50. This allows positioning of the components such that material is dispensed from the dispenser 50 at desired locations, to build up (additively manufacture) the propellant piece 12 in a desired configuration, for example providing openings for use as combustion chambers, and/or for receiving other components, such as igniters. The dispenser 50 may have an opening, though which the partially-cured propellant material is extruded, that has a diameter of from 0.3 mm to 0.7 mm. Other suitable sizes and/or shapes for an opening may also be used. This may allow for placement of suitably-sized portions of the material.

Suitable mechanisms and/or parts may be used to control dispensing of the partially-cured propellant material. For example, a stepper motor (not shown) may be actuated to control selective dispensing of the propellant material, when and where desired, for example by controlling a valve, or by controlling the pressure. The pressure decreases from the upstream portion of the system 10 to the outlet of the dispenser 50. The pressure in the system 10 may vary from an ambient pressure at the first mixer 16 to a below-ambient pressure, such as a near-vacuum pressure, at the outlet of the dispenser 50. Alternatively the high pressure at the first mixer 16 may be a pressure above ambient pressure, and the pressure at the outlet of the dispenser 50 may be at ambient pressure or some other pressure below that at the first mixer 16. The application of the controlled pressure, whether it be by a fluid or a mechanical device, may be applied at any point in the process, but not after the dispenser. As an example, the controlled pressure application may be at the very start of the process, where even the raw materials are fed into the mixer (also known as the first mixer), and all subsequent processes receive and dispense material according to the same pressure gradient across the given process step.

Parts of the system 10, such as the dispenser 50, the propellant piece 12, and the bed 58, may be located within a controlled-environment chamber 64. The chamber 64 itself may be operated at an elevated temperature (a temperature above the ambient temperature outside of the chamber 64). The chamber 64 may also have a controlled atmosphere within it, for example to prevent reactions with the elevated temperature propellant material. In addition the platform or bed 58 may have an elevated, controlled temperature. The heating of the chamber 64 and/or the bed 58 may be done to help prevent or reduce thermal gradients in the extruded propellant material. Such thermal gradients may cause warping in the finished propellant element. However heating of the chamber 64 and/or the bed 58 may be omitted.

The system 10 and the method 100 have advantages over prior systems and methods for producing propellant pieces. The process for producing the propellant piece 12 is an integrated one, one in which the all of the process may take place in a single location, without the delays and difficulties involved in transporting material from one location to another to perform various steps. In prior processes the mixing of the propellant material mixture may occur at a first location, the depositing of it to build up a propellant piece may occur at a second location, and the curing of the propellant piece may occur at a third location. This process may involve considerable delays for the transportation between steps, and certain individual steps may take significant amounts of time, for example with the curing process taking days or weeks. In addition safety precautions may need to be taken in transportation, for example when transporting the raw propellant mixture from a mixing location to an additive manufacturing location, and/or when transporting an uncured propellant piece to a cure oven or other curing apparatus.

As suggested by the previous paragraph, the system 10 and the method 100 may produce propellant pieces more quickly than prior systems and methods. A separate curing operation may be avoided by dispensing material in a partially-cured state, with subsequent curing occurring during the additive manufacturing process of building up the propellant piece.

Figure 6:
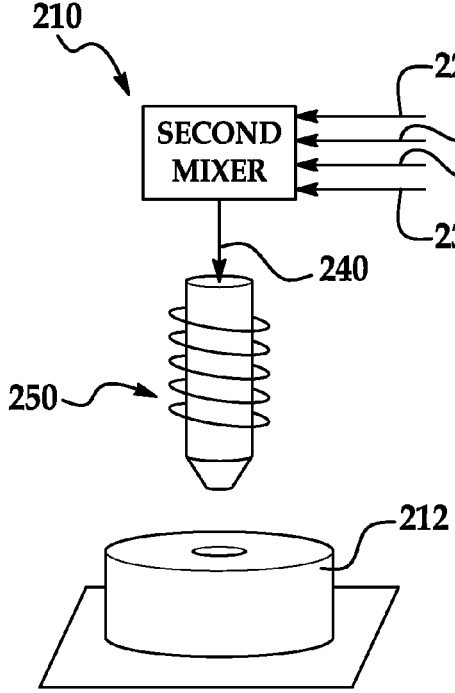
FIG. 6 is a schematic diagram of an additive manufacturing system in accordance with another embodiment of the present invention.

FIG. 6 shows an alternative system 210 which has only a single mixer 216, in which fuel 220, oxidizer 222, binder 224, and curative material 38 are combined to produce a curable propellant mixture 240 that is sent along to a dispenser 250. The dispenser 250 dispenses material to form a propellant element or piece 212. Except for the use of the single mixer 216, other parts of the system 210 may be similar to those of the system 10 (FIG. 1), described above.

The systems and methods described herein may be used to produce propellant pieces in any of a variety of suitable sizes. The propellant may be used as part of a rocket motor, for example, in conjunction with other suitable parts, such as casings, igniters, and nozzles. The propellant pieces may have any of a variety of suitable shapes, for example including open portions that may be usable as combustion chambers. Other devices, such as igniters, may be embedded in the propellant piece during the manufacturing of the propellant piece.

The propellant piece may be used in any of a variety of devices, for example in flight vehicles. Such flight vehicles may include missiles or spacecraft, to give two examples.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method of additively manufacturing a propellant element, the method comprising:
    mixing together fuel, oxidizer, and a binder, to form a propellant mixture;
    after the mixing, adding a curative to the propellant material to produce a curable propellant mixture;
    after the adding the curative, partially curing the curable propellant mixture; and
    after the partially curing, dispensing the curable propellant mixture as part of the propellant element;
    wherein the mixing, the adding, the partially curing, and the dispensing are all parts of a continuous process, with material proceeding from one step directly to subsequent steps; and
    wherein the partially curing includes heating the curable propellant mixture above a cure temperature of the curable propellant mixture.

2. The method of claim 1, wherein the mixing includes mixing the fuel, the oxidizer, and the binder in an acoustic mixer, to produce the propellant mixture.

3. The method of claim 2, wherein the adding the curative occurs in a second mixer, downstream from the acoustic mixer.

4. The method of claim 1, further comprising heating the propellant mixture after the adding the curative to produce a curable propellant mixture, and before the dispensing.

5. A method of additively manufacturing a propellant element, the method comprising:
    mixing together fuel, oxidizer, and a binder, to form a propellant mixture;
    after the mixing, adding a curative to the propellant material to produce a curable propellant mixture;
    after the adding the curative, partially curing the curable propellant mixture; and
    after the partially curing, dispensing the curable propellant mixture as part of the propellant element;
    wherein the partially curing includes heating the curable propellant mixture above a cure temperature of the curable propellant mixture;
    wherein the heating includes heating the curable propellant mixture prior to the dispensing, such that the curing of the curable propellant mixture is completed while the curable propellant mixture cools after the dispensing; and
    wherein the mixing, the adding, and the dispensing are all parts of a continuous process, with material proceeding from one step directly to subsequent steps.

6. The method of claim 1, wherein the heating includes heating the propellant mixture to a constant temperature that is above the cure temperature of the curable propellant material.

7. The method of claim 1, wherein the heating includes heating the propellant mixture to time-varying temperatures that are above the cure temperature.

8. The method of claim 1, wherein the partially curing includes curing the curable propellant mixture at least 50% before the dispensing.

9. The method of claim 1, wherein the partially curing includes curing the curable propellant mixture at least 90% before the dispensing.

10. The method of claim 1, wherein the partially curing includes curing the curable propellant mixture at least 95% before the dispensing.

11. The method of claim 1, wherein the dispensing includes extruding the curable propellant mixture.

12. The method of claim 1, further comprising, after the dispensing, finishing curing of the curable propellant mixture, during build-up of the propellant piece.

\* \* \* \* \*